Patented Feb. 17, 1953

2,628,975

UNITED STATES PATENT OFFICE 2,628,975

PROCESS FOR PREPARATION OF A SUBSTITUTED AMINO PROPANE DIOL

Robert Michel Jacob, Ablon-sur-Seine, and Jacques Georges Robert, Paris, France, assignors, by mesne assignments, to Parke, Davis & Company, Detroit, Mich., a corporation of Michigan No Drawing. Application February 23, 1951, Serial No. 212,483. In France February 28, 1950

9 Claims. (Cl. 260—519)

This invention relates to a new substituted aminopropane diol and to processes for its preparation.

The new substituted aminopropane diol of the present invention is the racemic erythro i. e. DL-erythro form of the structure conventionally represented as:

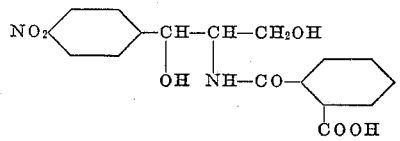

According to a feature of this invention, the new compound is prepared by condensing p-nitrobenzaldehyde with α-phthalimidoacetaldehyde in the presence of a basic condensing agent, reducing the condensation product and hydrolysing the product of reduction under alkaline conditions.

The said condensation is preferably effected in a suitable anhydrous organic solvent such as dioxane or pyridine at a temperature between 0° and 25° C. in the presence of a strong organic amine. One preferred condensing agent is piperidine, conveniently used in the form of its acetate. Other preferred condensing agents are strong tertiary amines free from hydroxyl groups such as triethylamine.

The product of condensation is believed to consist of an addition product of the aldol:

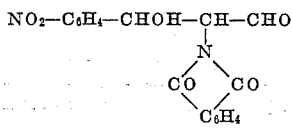

with α-phthalimidoacetaldehyde. It is preferred directly to use for the subsequent reduction step, crude condensation product having a melting point between 145° and 185° C. Preferably, the reaction conditions are chosen to yield a crude condensation product having a melting point between 150° and 170° C.

For the reduction step, there can be employed any method known to be capable of reducing an aldehyde to an alcohol function without affecting a nitro group. Preferably, however, there is employed the Meerwein method using an oxidisable aluminium alkoxide, preferably one derived from a secondary aliphatic alcohol such as aluminium isopropylate, or reduction by means of an alkali borohydride, e. g. sodium borohydride, prepared for example in the manner described in United States patent specification Serial No. 2,461,663.

This latter process is preferably effected in an organic solvent medium, conveniently in methanol, dioxane or dimethylacetamide, at a temperature in the neighbourhood of room temperature, for example between 10° and 50° C. The reduction product is 1-p-nitrophenyl-2-phthalimidopropane 1:3-diol.

Alkaline hydrolysis of the latter product can be carried out by known methods and preferably by treatment with caustic soda, to produce racemic erythro 2-o-carboxybenzamido-1-p-nitrophenylpropane 1:3-diol which is an important intermediate for the synthesis of compounds having antibiotic activity, in particular 2-dichloracetamido-1-p-nitrophenylpropane 1:3 diol.

The present invention is illustrated by the following examples:

*Example I*

4.53 g. of p-nitrobenzaldehyde are dissolved in 25 c. c. of anhydrous dioxane and the resultant solution is mixed at 10° C. with a solution of 5.67 g. of α-phthalimidoacetaldehyde (prepared by the method of MacCorquodale R. 51 487 (1932)) in 33 c. c. of anhydrous dioxane. After the addition to the mixture of 5 c. c. of anhydrous triethylamine, the mixture is allowed to stand for three days at room temperature, whereafter the volatile products are driven off by heating to about 40° C. under a pressure of 20 mm. of mercury. The residual oil is taken up in 65 c. c. of methanol and the product which crystallises is filtered off. The crude residue from the filtration melting at 153° to 155° C. is taken up in 120 c. c. of anhydrous isopropyl alcohol, 5.26 g. of aluminium isopropoxide are added and the mixture is distilled in a flask fitted with a condenser. At the end of about an hour 70 c. c. of a mixture of isopropyl alcohol and acetone have distilled off. The contents of the flask are then taken up in 50 c. c. of water, made acid to Congo Red by the addition of dilute sulphuric acid and then extracted with ether. Evaporation of the ethereal extracts yields 5.1 g. of an oily residue which is taken up in 7.5 c. c. of methanol. There is then added, drop by drop and with vigorous agitation, 13 c. c. of a normal aqueous solution of caustic soda; the mixture is further diluted with 10 c. c. of water and is then extracted several times with ether. The aqueous solution is acidified with 5 c. c. of 4 N sulphuric acid. The product which crystallises is filtered off, washed with water and then with ether and finally air-dried. There is thus obtained 1.7 g. of DL-erythro 2-o-carboxybenzamido-1-p-nitrophenyl-propane 1:3- diol which can be purified by dissolution in aqueous sodium bicarbonate solution, decolourisation with charcoal and precipitation with acid. It melts with decomposition at about 168° to 170° C. (capillary).

Example II

To a solution of 3.0 g. of p-nitrobenzaldehyde and 7.6 g. of α-phthalimidoacetaldehyde in 20 c. c. of anhydrous dioxane, cooled to 15° C., there is added a solution of 0.3 g. of piperidyl acetate in 2 c. c. of anhydrous dioxane. The mixture is left for six days in a refrigerator. It is then taken up in 120 c. c. of dioxane whereafter 60 c. c. of a 33% isopropanol solution of aluminium isopropylate are added; by reducing the pressure to 350 mm. pressure of mercury, a mixture of dioxane, isopropanol and acetone rapidly distills off. The residue is treated with ice and acidified with dilute sulphuric acid. By extraction with ether and evaporation of the solvent there is obtained 9 g. of an oily residue which is treated with 8 c. c. of 2 N caustic soda solution. After extraction with ether, the decanted alkaline solution is acidified with dilute sulphuric acid when there is precipitated a product which is filtered, washed with water and then air-dried. There is thus obtained 2.35 g. of crude DL-erythro 2-o-carboxybenzamido-1-p-nitrophenylpropane 1:3-diol melting with decomposition at 164° to 166° C. (capillary).

Example III

A mixture of 24.0 g. of α-phthalimidoacetaldehyde and 9.6 g. of p-nitrobenzaldehyde is dissolved in 63.5 c. c. of anhydrous dioxane. After the solution has been cooled to 15° C. there is then added 2.7 c. c. of anhydrous triethylamine. The resulting reaction mixture is allowed to stand for ten days in a refrigerator at a temperature of about 4° C. The thick mass obtained is taken up in 40 c. c. of methanol previously cooled to 10° C. and the mixture rapidly filtered. The residue is washed with methyl alcohol and then with ether and then dried under reduced pressure. There is thus obtained 25.3 g. of a condensation product melting at about 148° to 151° C. (capillary). This crude product is suspended in 143 c. c. of methanol and there is then added, with agitation, a solution of 1.9 g. of sodium borohydride (83%) in 24 c. c. of a weakly alkaline methanol solution, the mixture being cooled to keep the temperature about 30° C. With cooling to 20° C. there is then added 143 c. c. of water followed by 44 c. c. of 4 N caustic soda solution. The alkaline solution thus obtained is first extracted twice with ether and is then acidified with 4 N sulphuric acid until just acid to Congo red. There is thus precipitated a white crystalline product which is filtered, washed with water and then dried in vacuo to give 11.4 g. of DL-erythro 2-o-carboxybenzamido-1-p-nitrophenylpropane 1:3-diol melting with decomposition at 177° to 178° C. (capillary).

Example IV

A suspension of 5.3 g. of the condensation product of α-phthalimidoacetaldehyde and of p-nitrobenzaldehyde (M. P. 165° to 167° C.) in 30 c. c. of methanol rendered weakly alkaline (0.016 N) by the addition of 10 N caustic soda solution is agitated. A solution of 0.6 g. of potassium borohydride in 5 c. c. of water is run into this suspension in 2 minutes, the temperature being maintained at about 30° C. by external cooling. After 10 minutes, 30 c. c. of water and 10 c. c. of 4 N caustic soda are added to the suspension thus obtained. The resulting solution is extracted with ether, and thereafter rendered just acid to Congo red with dilute sulphuric acid. The product which crystallises is filtered, washed with water and dried in vacuo (first fraction). The mother liquors and the washings are extracted with methyl ethyl ketone, and the latter is extracted with a solution of sodium bicarbonate, from which a second fraction of crystallised product is precipitated by acidification with dilute sulphuric acid. The first and second fractions are combined and 1.75 g. of DL-erythro 2-o-carboxybenzamido-1-p-nitrophenylpropane 1:3-diol of a melting point (capillary) of 178° to 182° C. (decomp.) are obtained.

We claim:

1. A process for the production of a new substituted aminopropane diol, being DL-erythro 2-o-carboxybenzamido-1-p-nitrophenylpropane 1:3-diol, which comprises condensing p-nitrobenzaldehyde with alpha-phthalimidoacetaldehyde in the presence of a basic condensing agent to produce a reaction product having a melting point between 145° and 185° C., reducing that reaction product by means of an oxidisable aluminum alkoxide, and hydrolysing the product of reduction under alkaline conditions.

2. A process for the production of a new substituted aminopropane diol, being DL-erythro 2-o-carboxybenzamido-1-p-nitrophenylpropane 1:3-diol, which comprises condensing p-nitrobenzaldehyde with alphaphthalimidoacetaldehyde in the presence of a basic condensing agent to produce a reaction product having a melting point between 145° and 185° C., reducing that reaction product by means of an oxidisable aluminum salt of a secondary aliphatic alcohol, and hydrolysing the product of reduction under alkaline conditions.

3. A process for the production of a new substituted aminopropane diol, being DL-erythro 2-o-carboxybenzamido-1-nitrophenylpropane 1:3-diol, which comprises condensing p-nitrobenzaldehyde with alphaphthalimidoacetaldehyde in the presence of a basic condensing agent to produce a reaction product having a melting point between 145° and 185° C., reducing that reaction product with an alkali metal borohydride and hydrolysing the product of reduction under alkaline conditions.

4. A process for the production of a new substituted aminopropane diol, being DL-erythro 2-o-carboxybenzamido-1-p-nitrophenylpropane 1:3-diol, which comprises condensing p-nitrobenzaldehyde with alphaphthalimidoacetaldehyde in the presence of a basic condensing agent to produce a reaction product having a melting point between 145° and 185° C., reducing that reaction product with potassium borohydride, and hydrolysing the product of reduction under alkaline conditions.

5. A process for the production of a new substituted aminopropane diol, being DL-erythro 2-o-carboxybenzamido-1-p-nitrophenylpropane 1:3-diol, which comprises condensing p-nitrobenzaldehyde with alpha-phthalimidoacetaldehyde in the presence of a basic condensing agent to produce a reaction product having a melting point between 145° and 185° C., reducing that reaction product with an alkali metal borohydride in organic medium and hydrolysing the product of reduction under alkaline conditions.

6. A process for the production of DL-erythro

2 - o - carboxybenzamido - 1 - p - nitrophenylpropane 1:3-diol which comprises forming in the cold a solution in anhydrous dioxane of p-nitrobenzaldehyde and alpha-phthalimidoacetaldehyde, adding thereto anhydrous triethylamine, allowing the reaction mixture to stand until reaction is complete, isolating a crystalline product melting at 150–170° C. treating that crystalline product with potassium borohydride in methanol suspension, the reaction temperature being kept below about 30° C., treating the resultant reaction mixture with dilute caustic soda solution and, after extraction with ether, acidifying to precipitate a crystalline product which is then collected.

7. A process for the production of DL-erythro 2 - o - carboxybenzamido - 1 - p - nitrophenylpropane 1:3-diol which comprises forming in the cold a solution in anhydrous pyridine of p-nitrobenzaldehyde and alpha-phthalimidoacetaldehyde, adding thereto anhydrous triethylamine, allowing the reaction mixture to stand until reaction is complete, isolating a crystalline product melting at 150–170° C. treating that crystalline product with potassium borohydride in methanol suspension, the reaction temperature being kept below about 30° C., treating the resultant reaction mixture with dilute caustic soda solution and, after extraction with ether, acidifying to precipitate a crystalline product which is then collected.

8. A process for the production of DL-erythro 2 - o - carboxybenzamido - 1 - p - nitrophenylpropane 1:3-diol which comprises forming in the cold a solution in anhydrous dioxane of p-nitrobenzaldehyde and alpha-phthalimidoacetaldehyde, adding thereto anhydrous piperidyl acetate, allowing the reaction mixture to stand until reaction is complete, isolating a crystalline product melting at 150–170° C. treating that crystalline product with potassium borohydride in methanol suspension, the reaction temperature being kept below about 30° C., treating the resultant reaction mixture with dilute caustic soda solution and, after extraction with ether, acidifying to precipitate a crystalline product which is then collected.

9. A process of the production of a new substituted aminopropane diol, being DL-erythro-2 - o - carboxybenzamido - 1 - p - nitrophenylpropane-1,3-diol, which comprises condensing p-nitrobenzaldehyde with alpha-phthalimidoacetaldehyde in the presence of a basic condensing agent to produce a reaction product having a melting point between 145 and 185° C. reducing the said reaction product with a member of the class consisting of oxidizable aluminium alkoxides and alkali metal borohydrides and hydrolyzing the DL-erythro-1-p-nitrophenyl-2-phthalimido-propane-1,3-diol so produced under alkaline conditions.

ROBERT MICHEL JACOB.
JACQUES GEORGES ROBERT.

REFERENCES CITED

The following references are of record in the file of this patent:

UNITED STATES PATENTS

| Number | Name | Date |
|---|---|---|
| 2,483,885 | Crooks et al. | Oct. 4, 1949 |
| 2,516,098 | Barnbas | July 25, 1950 |
| 2,516,130 | Long et al. | July 25, 1950 |

OTHER REFERENCES

Lynn "Org. Chem." (Lea & Febiger, 3rd. ed.), pp. 188–189 (1948).